United States Patent Office 2,838,532
Patented June 10, 1958

2,838,532
6-HALO-17(20)-PREGNENES

George B. Spero and John A. Hogg, Kalamazoo Township, Kalamazoo County, Mich., assignors to The Upjohn Company, Kalamazoo, Mich., a corporation of Michigan No Drawing. Application July 1, 1955
Serial No. 519,632

3 Claims. (Cl. 260—397.45)

This invention relates to intermediates in the production of 6-fluorohydrocortisone and 21-esters thereof and to a process for their production.

It is an object of the present invention to provide novel intermediates useful in the production of 6-fluorohydrocortisone, and 21-esters thereof. A further object is the provision of a process for the production thereof. Other objects will be apparent to those skilled in the art to which this invention pertains.

The 6-fluorohydrocortisone and 21-esters thereof have antiphlogistic, anti-rheumatoid arthritic, some mineralocorticoid, and anti-inflammatory activity. They are useful in the treatment of inflammatory conditions of the skin, eyes and ears of humans and valuable domestic animals which are due to a variety of bacterial and fungal infections, contact dermatitis and other allergenic reactions.

The novel 6-fluorohydrocortisones and intermediates in the production thereof may be represented by the following formulae:

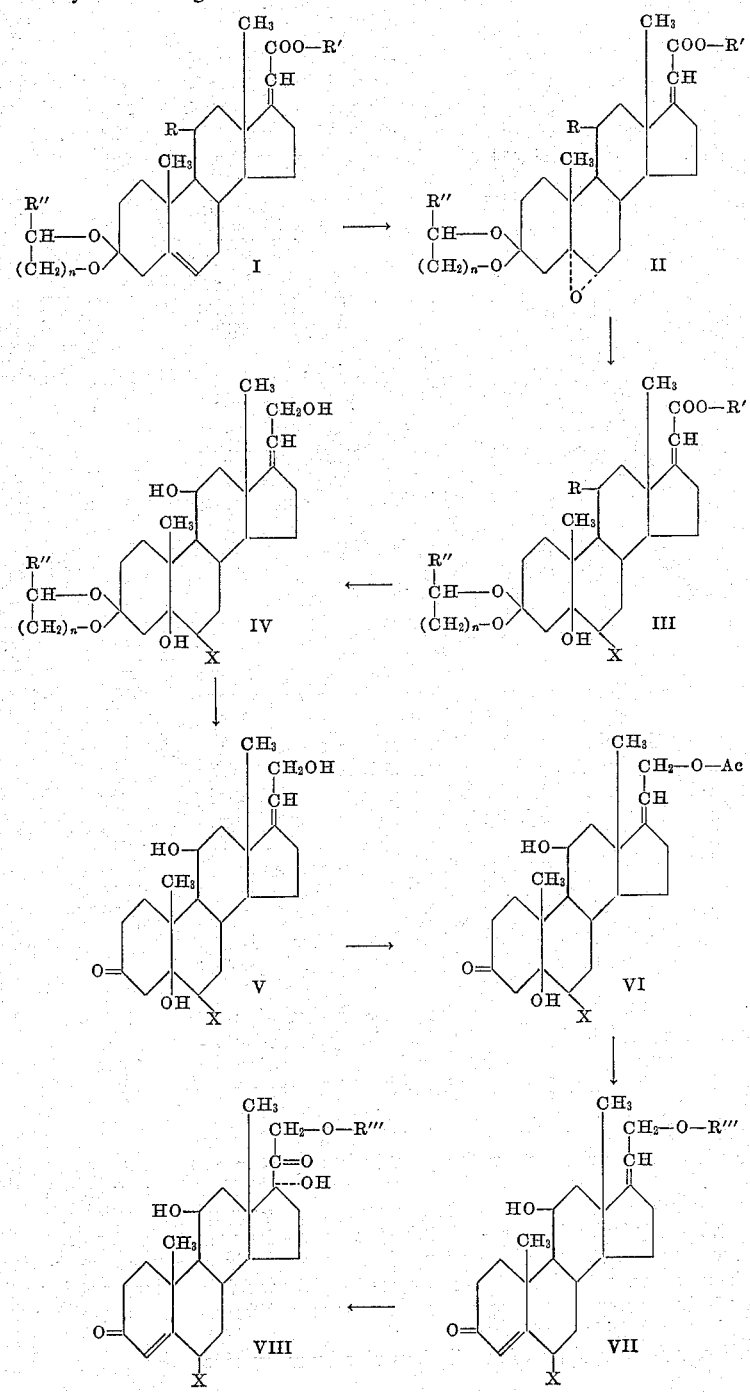

wherein R is β-hydroxy or keto, R' and R" are hydrogen or lower-alkyl, $n$ is a whole number from one to two, X is fluorine. Ac is the acyl radical of a hydrocarbon carboxylic acid containing from one to twelve carbon atoms, inclusive, and R''' is hydrogen or Ac as defined above. The term lower-alkyl, when used herein, means containing from one to eight carbon atoms, inclusive, e. g., methyl, ethyl, propyl, butyl, amyl, hexyl, heptyl, octyl.

Oxidation of a 6-fluorohydrocortisone 21-acetate or other ester (VIII), e. g., with chromic acid in acetic acid, is productive of 21-esters of 6-fluorocortisone, which compounds also possess mineralocorticoid, glucocorticoid and anti-inflammatory activity.

In the reactions described hereinbelow, the preferred compounds I–VII have the 17(20)-cis configuration. The cis isomers of VII can be converted in higher yields to VIII than the corresponding trans isomers. The trans isomer of I can be prepared by refluxing a solution of the corresponding cis isomer of I in methanol containing sodium methoxide.

In carrying out the epoxidation step of the process of the present invention, a 3-ketal of 3-keto-11-oxygenated-4,17(20)-pregnadiene-21-carbonyloxy steroid represented by Formula I, which can be prepared as disclosed in U. S. Patent 2,707,184, preferably the 3-ethylene glycol ketal of lower-alkyl, especially methyl, 3,11-diketo-4,17(20)-[cis]-pregnadiene-21-oate, is epoxidized with a peracid, e. g., peracetic or perbenzoic, or other known epoxidizing agent, according to methods known in the art, to produce the corresponding 5:6-oxide (II). A mixture of both the alpha and beta oxides is produced in this reaction which can be separated by chromatographic or crystallization techniques well known in the art.

In the epoxide opening step of the present invention, a 3 - ketalized 3 - keto - 5α,6α - oxido - 11 - oxygenated-17(20)-pregnene-21-carbonyloxy steroid (II), preferably the 3-ethylene glycol ketal of lower-alkyl, preferably methyl, 3,11 - diketo - 5α,6α - oxido - 17(20) - [cis]-pregnene-21-oate, is reacted with hydrogen fluoride, to open the oxide and produce the corresponding 3-ketalized 3 - keto - 5 - hydroxy - 6 - fluoro - 11 - oxygenated-17(20)-pregnene-21-carbonyloxy steroid (III). The reaction is ordinarily performed at between about minus forty and plus fifty degrees centigrade, the preferred limits being about zero to 25 degrees centigrade. A catalyst may be employed, e. g., boron trifluoride under anhydrous conditions or a hypohalous acid under aqueous conditions. Reaction conditions, for example, those disclosed by Schmidlin et al., Helv. Chim. Acta, 36, 1241 (1953); Gallagher, J. Biol. Chem., 162, 495 (1946); Cornforth et al., J. Chem. Soc., 1954, 907 and Fried et al., J. Am. Chem. Soc., 75, 2273 (1953), are usually employed.

If anhydrous conditions are difficult or inconvenient to maintain, the oxide opening reaction can be performed under aqueous conditions in which case the ketal will be hydrolyzed at the same time. The thus-produced 3-keto group can then be reketalized in the manner described hereinabove to produce the corresponding ketal (III).

In the reduction step of the present invention, a 3-ketalized 3-keto-5-hydroxy-6-fluoro-11-oxygenated - 17 - (20)-pregnene-21-carbonyloxy steroid (III), preferably the 3-ethylene glycol ketal of lower-alkyl, preferably methyl, 3,11-diketo-5-hydroxy - 6 - fluoro - 17(20) - [cis]-pregnene-21-oate, is reduced with lithium aluminum hydride or other chemical carboxyl reducing agent in an organic solvent, e. g., ether, dioxane, tetrahydrofuran, benzene, to produce the corresponding 3-ketalized 5,11β,21-trihydroxy-6-fluoro - 17(20) - pregnene - 3 - one. In the reaction, the reaction mixture is preferably mixed with water or, an acid, an ester or carbonyl agent followed by water, to decompose any excess lithium aluminum hydride and organo-metal complexes. The usual reaction conditions for a lithium aluminum hydride reduction are employed, except that a reaction temperature at room temperature or below is preferred, to ensure that reaction with the 6-fluoro does not occur, and acid is preferably not employed in the decomposition step, to ensure that a variety of side reactions do not occur.

The hydrolysis step involves the hydrolysis of the ketal group of the 3-ketalized 5,11β,21-trihydroxy-6-fluoro-17(20)-pregnene-3-one (IV), preferably the 3-ethylene glycol ketal of 5,11β,21-trihydroxy-6-fluoro-17(20)-[cis]-pregnene-3-one, with aqueous acid under the usual conditions to produce the corresponding 5,11β,21-trihydroxy-6-fluoro-17(20)-pregnene-3-one (V). The hydrolysis is usually performed under fairly mild conditions, e. g., at room temperature and with fairly weak aqueous acetic or sulfuric acid, to ensure that the functional groups other than the 3-ketal are unaffected.

The reduction step and hydrolysis step may be performed concurrently, without isolation of the intermediate reduced ketal (IV), if desired. This may be accomplished by hydrolysis of the total reaction mixture from the reduction step with dilute aqueous acid, as described above, or by decomposing the reduction mixture with water, separating the aqueous layer and mixing the organic layer with aqueous acid until hydrolysis is complete.

The esterification step of the present invention involves the conversion of the 21-hydroxy group of 5,11β,21-trihydroxy-6-fluoro-17(20)-pregnene-3-one (V), preferably 5,11β,21-trihydroxy-6-fluoro-17(20)-[cis]-pregnene-3-one, to a 21-acyloxy group to produce the corresponding 5,11β-dihydroxy-6-fluoro-21-acyloxy - 17(20) - pregnene - 3-one (VI). This reaction can be performed under the esterification conditions known in the art, e. g., by the reaction of V with the selected acid anhydride or acid chloride or bromide of a hydrocarbon carboxylic acid, or by reaction with the selected acid, in the presence of an esterification catalyst or with an ester under ester exchange reaction conditions. Reaction conditions which are apt to affect the labile 11β-hydroxy group or 6-fluoro group should be avoided. Compounds thus-produced include the compounds represented by Formula VI wherein the 17(20)-configuration is cis, the 6-halogen is fluorine and Ac is the acyl radical of a hydrocarbon carboxylic acid containing from one to twelve carbon atoms, inclusive, e. g. formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e. g., cyclopropylideneacetic, cyclopentylformic, cyclopentylacetic, β-cyclohexylpropionic, cyclohexylformic, cyclohexylacetic, β-cyclohexylpropionic, an aryl or alkaryl acid, e. g., benzoic, 2-, 3- or 4-methylbenzoic, 2,3-, 2-4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenyl-acetic, triphenylacetic, etc.

In the dehydration reaction of the present invention, a 5,11β-dihydroxy-6-fluoro-21-acyloxy-17(20) - pregnene-3-one (VI), preferably 5,11β-dihydroxy-6-fluoro-21-acyloxy-17(20)-[cis]-pregnene-3-one, is reacted with a 5-hydroxy dehydrating agent to produce a 6-fluoro-11β-hydroxy-21-acyloxy-4,17(20)-pregnadiene - 3 - one (VII). Hydrogen chloride and Girard's Reagent T have been employed as dehydrating agents. See Herzig and Ehrenstein, J. Org. Chem., 16, 1050 (1951). Care should be taken that the reaction conditions are not so vigorous that the 11β-hydroxy group is affected by the dehydrating agents. Acetic anhydride, p-toluenesulfonic acid and acetic acid or thionyl chloride and pyridine are also operable as 5-hydroxy dehydrating agents.

The esterification and dehydration reactions of the present invention may, if desired, be reversed, i. e., the dehydration reaction performed first. Under these conditions, reaction conditions should be employed in the dehydration reaction which are least apt to affect the 21- hydroxy group which is somewhat more sensitive to the dehydration agents than the corresponding 21-acyloxy compounds. If acetic anhydride is employed as the dehydrating agent, the esterification and dehydration reaction will occur concomitantly.

The oxidative hydroxylation reaction of the present invention converts a 6-fluoro-11β-hydroxy-21-acyloxy-4,17(20)-pregnadiene-3-one (VII), preferably 6-fluoro-11β-hydroxy-21-acetoxy-4,17(20)-[cis] - pregnadiene - 3 - one, to the corresponding 6-fluoro-11β,17α-dihydroxy-21-acyloxy-4-pregnene-3,20-dione (VIII) by reaction with a catalytic amount of osium tetroxide and an oxygen donating oxidizing agent. Included among the oxidizing agents are hydrogen peroxide, peracids, alkyl peroxides, amine oxide peroxides, etc. The preparation of a number of oxidizing agents and the reaction conditions which are preferably employed is discussed more fully in the copending application of Lincoln and Hogg, S. N. 476,061, filed December 17, 1954.

A preferred procedure involves employing from about two to about three molar equivalents of the oxidizing agent and less than 0.05 molar equivalent of osmium tetroxide, calculated on the starting steriod, in tertiary butyl alcohol at about room temperature.

The following examples are illustrative of the products and process of the present invention, but are not to be construed as limiting.

EXAMPLE 1

*The 3-ethylene glycol ketal of methyl 3,11-diketo-5α,6α-oxido-17(20)-[cis]-pregnene-21-oate*

To a solution of 0.801 gram of the 3-ethylene glycol ketal of methyl 3,11-diketo-4,17(20)-[cis]-pregnadiene-21-oate, prepared in the manner described in U. S. Patent 2,707,184, in sixteen milliliters of chloroform was added a solution of 303 milligrams of perbenzoic dissolved in 4.76 milliliters of chloroform. The solution was maintained at about four degrees centigrade for 24 hours and then at room temperature for 72 hours. The solution was then washed with a five percent aqueous solution of sodium bicarbonate and then with water. The chloroform layer was separated, dried and the solvent distilled to give a residue of 0.948 gram of solid. Crystallization of this solid from acetone gave 0.333 gram melting at 198 to 205 and after two crystallizations from acetone, there was obtained the 3-ethylene glycol ketal of methyl 3,11-diketo-5α,6α-6-oxido-17(20)-[cis]-pregnene-21-oate melting at 206 to 209 degrees centigrade and having the analysis given below:

Calculated for $C_{24}H_{32}O_6$: C, 69.20; H, 7.75. Found: C, 69.59; H, 7.81.

EXAMPLE 2

*The 3-ethylene glycol ketal of methyl 3,11-diketo-5-hydroxy-6-fluoro-17(20)-[cis]-pregnene-21-oate*

A solution of 400 milligrams of the 3-ethylene glycol ketal of methyl 3,11 - diketo - 5α,6α - oxido - 17(20)-[cis]-pregnene-21-oate in five milliliters of alcohol-free chloroform was cooled to minus fifteen degrees centigrade. To the cooled solution was added 2.5 milliliters of an ice cold solution of about 100 milligrams of anhydrous hydrogen fluoride in five milliliters of alcohol-free chloroform. The reaction mixture was stored at minus fifteen degrees centigrade for four hours with occasional stirring. The solution was then washed at about zero degrees centigrade with aqueous sodium bicarbonate and then with water. The washed chloroform solution was dried and then distilled to dryness, leaving a residue of 3-ethylene glycol ketal of methyl 3,11-diketo-5-hydroxy-6-fluoro-17-(20)-[cis]-pregnene-21-oate having a melting point of 170 to 173 degrees centigrade.

EXAMPLE 3

*3-ethylene glycol ketal of 5,11β,21-trihydroxy-6-fluoro-17(20)-[cis]-pregnene-3-one*

A solution of 150 milligrams of the 3-ethylene glycol ketal of methyl 3,11-diketo-5-hydroxy-6-fluoro-17(20)-[cis]-pregnene-21-oate in seven milliliters of benzene was added dropwise to a stirred mixture of 150 milligrams of lithium aluminum hydride and five milliliters of anhydrous ether, while maintaining the solution at about room temperature. The stirred reaction mixture was then poured over crushed ice to decompose the excess lithium aluminum hydride. Twenty milliliters of methylene chloride was added to the mixture, the organic phase was separated and dried, the solvent distilled from the dried solution and the distillation residue was crystallized from a mixture of ethyl acetate and Skellysolve B hexane hydrocarbons to yield 3-ethylene glycol ketal of 5,11β,21-trihydroxy-6-fluoro-17(20)-[cis]-pregnene-3-one having a melting point of 197 to 205 degrees centigrade.

EXAMPLE 4

*5,11β,21-trihydroxy-6-fluoro-17(20)-[cis]-pregnene-3-one*

A solution of 57 milligrams of the 3-ethylene glycol ketal of 5,11β,21-trihydroxy-6-fluoro-17(20)-[cis]-pregnene-3-one in four milliliters of acetone was diluted with water to a volume of five milliliters and one drop of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of 5,11β,21-trihydroxy-6-fluoro-17(20)-[cis]-pregnene-3-one.

EXAMPLE 5

*5,11β-dihydroxy-6-fluoro-21-acetoxy-17(20)-[cis]-pregnene-3-one*

A solution of 51 milligrams of 5,11β,21-trihydroxy-6-fluoro-17(20)-[cis]-pregnene-3-one in one milliliter of pyridine was mixed with 0.2 milliliter of acetic anhydride and the whole was then maintained at room temperature for seventeen hours whereafter crushed ice was added thereto. The precipitated 5,11β-dihydroxy-6-fluoro-21-acetoxy-17(20)-[cis]-pregnene-3-one was filtered therefrom, dissolved in benzene and then fractionally crystallized to obtain substantially pure 5,11β-dihydroxy-6-fluoro-21-acetoxy-17(20)-[cis]-pregnene-3-one.

Similarly, other 21-organic carboxylic acid esters of 5-11β,21-trihydroxy-6-fluoro-17(20) - [cis] - pregnene-3-one are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 5,11β,21-trihydroxy-6-fluoro-17(20)-pregnene-3-one with an appropriate acylating agent, e. g., the anhydride or acid halide of the selected acid in a solvent such as, for example, benzene, toluene, acetic acid, or the like. A convenient method of preparing the 21-formyloxy ester consists in contacting 5,11β,21-trihydroxy-6-fluoro-17(20) - [cis]-pregnene-3-one with formic acid in the presence of para-toluenesulfonic acid.

EXAMPLE 6

*6-fluoro-11β-hydroxy-21-acetoxy-4,17(20)-[cis]-pregnadiene-3-one*

To a solution of 100 milligrams of 5,11β-dihydroxy-6-fluoro-21-acetoxy-17(20)-[cis]-pregnene-3-one dissolved in two milliliters of absolute ethanol was added 250 milligrams of Girard's Reagent T and 0.12 milliliter of glacial acetic acid. The mixture was refluxed in a steam bath for one hour, cooled and then mixed with six milliliters of 6 N hydrochloric acid and 1.5 milliliters of water. After maintaining the mixture at room temperature for five hours, the mixture was extracted with ether which was then washed with aqueous sodium bicarbonate and water and then dried. The ether was distilled and the residue chromatographed over a five gram column of Florisil synthetic magnesium silicate. The column was developed with Skellysolve B containing increasing percentages of acetone. The main eluate crystalline fraction consisted of 6-fluoro-11β-hydroxy-21-acetoxy-4,17-(20)-[cis]-pregnadiene-3-one.

EXAMPLE 7

*6-fluoro-11β,17α-dihydroxy-21-acetoxy-4-pregnene-3,20-dione*

To a solution of 250 milligrams of 6-fluoro-11β-hydroxy-21-acetoxy-4,17(20)-[cis]-pregnadiene-3-one dissolved in thirteen milliliters of tertiary butyl alcohol was added 0.127 milliliter of pyridine followed by a solution of 245 milligrams of N-methylmorpholine oxide peroxide in one milliliter of tertiary butyl alcohol and less than 0.05 molar equivalent of osmium tetroxide, calculated on the starting steroid, in tertiary butyl alcohol. The N-methylmorpholine oxide peroxide was prepared by the reaction of N-methylmorpholine with two molar equivalents of hydrogen peroxide in tertiary butyl alcohol. The mixture was maintained at about 25 degrees centigrade for eighteen hours and then mixed with 0.5 milliliter of an 0.5 N aqueous solution of $Na_2S_2O_4$ and some Magnesol filter aid. The solution was filtered and most of the tertiary butyl alcohol distilled from the filtrate at reduced pressure and at room temperature. The concentrate was diluted with ten milliliters of water added portionwise. The steroidal precipitate was filtered and dried to give 6-fluoro-11β,17α-dihydroxy-21-acetoxy-4-pregnene-3,20-dione. Recrystallization of the precipitate from a mixture of ethyl acetate and acetone gave substantially pure product having a melting point of 210 to 218 degrees centigrade.

Similarly, other 6-fluoro-11β-hydroxy-21-acyloxy-4-pregnene-3-ones, e. g., wherein the acyl radical is that of an acid named herein, are converted to the corresponding 6-fluoro-11β,17α-dihydroxy-21-acyloxy-4-pregnene-3,20-diones.

EXAMPLE 8

*6-fluoro-11β,17α,21-trihydroxy-4-pregnene-3,20-dione*

A solution of 422 milligrams of 6-fluoro-hydrocortisone acetate in four milliliters of methanol was freed of oxygen gas by bubbling nitrogen therethrough. A solution of 404 milligrams of potassium bicarbonate in four milliliters of water was similarly freed of oxygen. The two solutions were mixed at a temperature of between eighteen and twenty degrees centigrade and in a nitrogen atmosphere. The temperature of the solution rose to between 24 and 26 degrees centigrade. The mixture was stirred at room temperature for five hours while protecting it, from atmospheric oxygen, with nitrogen. At the end of five hours the solution was neutralized with dilute acetic acid. The neutralized solution was concentrated by distillation at room temperature at reduced pressure, and then chilled in a refrigerator for about sixteen hours. The thus-precipitated 6-fluoro-hydrocortisone was filtered, washed with ice-water and then dried.

6-fluoro-hydrocortisone acetate can also be prepared by using the 3-ethylene glycol ketal of methyl 3-keto-11β-hydroxy-4,17(20)-[cis]-pregnadiene-21-oate, prepared by the ketalization of methyl 3-keto-11β-hydroxy-4,17(20)-[cis]-pregnadiene-21-oate, in the manner described in U. S. 2,707,184, as the starting steroid for the series of reactions described in Examples 1 to 3 thereby producing the 3-ethylene glycol of 5,11β,21-trihydroxy-6-fluoro-17(20)-[cis]-pregnadiene-3-one, and continuing with the reactions described in Examples 4 to 7.

It is to be understood that the invention is not to be limited to the exact details of operation described as obvious modifications and equivalents will be apparent to one skilled in the art and the invention is therefore to be limited only by the scope of the appended claims.

We claim:

1. A compound of the following formula:

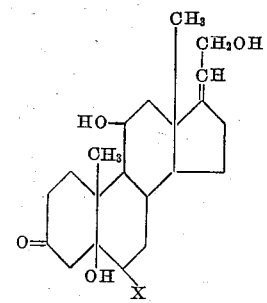

and the 21-acylates thereof wherein the acyl radical is that of a hydrocarbon carboxylic acid containing from one to twelve carbon atoms, inclusive, and X is fluorine.

2. A compound of the following formula:

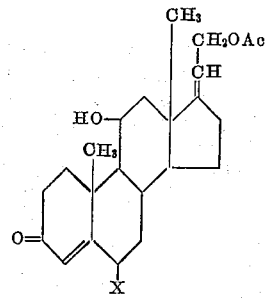

wherein Ac is the acyl radical of a hydrocarbon carboxylic acid containing from one to twelve carbon atoms, inclusive, and X is fluorine.

3. 6 - fluoro - 11β - hydroxy - 21 - acetoxy - 4,17(20)-pregnadien-3-one.

References Cited in the file of this patent

UNITED STATES PATENTS

| 2,705,237 | Djerassi et al. | Mar. 29, 1955 |
| 2,737,518 | Herzog | Mar. 6, 1956 |
| 2,742,461 | Bernstein et al. | Apr. 17, 1956 |
| 2,759,929 | Farrar et al. | Aug. 21, 1956 |

FOREIGN PATENTS

| 735,429 | Great Britain | Aug. 24, 1955 |

OTHER REFERENCES

J. A. C. S., vol. 76, pages 1455–6 and 5020–3 (1954).
Chem. Abstracts, vol. 44, 4016 and 4137g (1950); vol. 48, 13073e (1954).
Zhurnal Obshchei Khimie, vol. 9, pp. 436–441 (1939).